(12) United States Patent
Krishnamurthy et al.

(10) Patent No.: US 10,284,544 B2
(45) Date of Patent: *May 7, 2019

(54) SECURING A COMPUTING DEVICE ACCESSORY

(71) Applicant: Microsoft Technology Licensing, LLC, Redmond, WA (US)

(72) Inventors: Harish Krishnamurthy, Redmond, WA (US); Ming Zhu, Sammamish, WA (US); Kurt Torben Nielsen, Snoqualmie, WA (US); Matthew Morris, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/949,494

(22) Filed: Apr. 10, 2018

(65) Prior Publication Data

US 2018/0227295 A1    Aug. 9, 2018

Related U.S. Application Data

(60) Continuation of application No. 15/495,543, filed on Apr. 24, 2017, now Pat. No. 9,948,636, which is a
(Continued)

(51) Int. Cl.
*H04L 29/06* (2006.01)
*H04L 9/32* (2006.01)
(Continued)

(52) U.S. Cl.
CPC ...... *H04L 63/0823* (2013.01); *G06F 15/7807* (2013.01); *H04L 9/32* (2013.01);
(Continued)

(58) Field of Classification Search
CPC ..... H04L 9/32; H04L 9/3263; H04L 63/0823; H04L 63/0869; H04L 63/0428;
(Continued)

(56) References Cited

U.S. PATENT DOCUMENTS

| 9,130,910 B1* | 9/2015 | Logue | H04L 63/0428 |
| 2011/0078483 A1* | 3/2011 | Islam | G06F 11/2236 |
| | | | 713/400 |

(Continued)

OTHER PUBLICATIONS

"Second office Action Issued in Chinese Patent Application No. 201480007047.9", dated Jul. 3, 2018, 4 Pages.

*Primary Examiner* — Don G Zhao
(74) *Attorney, Agent, or Firm* — Alleman Hall Creasman & Tuttle LLP

(57) ABSTRACT

Various embodiments are disclosed that relate to security of a computer accessory device. For example, one non-limiting embodiment provides a host computing device configured to conduct an initial portion of a mutual authentication session with an accessory device, and send information regarding the host computing device and the accessory device to a remote pairing service via a computer network. The host computing device is further configured to, in response, receive a pairing certificate from the remote pairing service, the pairing certificate being encrypted via a private key of the remote pairing service, and complete the mutual authentication with the accessory device using the pairing certificate from the remote pairing service.

20 Claims, 9 Drawing Sheets

Related U.S. Application Data continuation of application No. 14/827,677, filed on Aug. 17, 2015, now Pat. No. 9,660,815, which is a division of application No. 13/757,561, filed on Feb. 1, 2013, now Pat. No. 9,124,434.

(51) Int. Cl.
*H04W 12/06* (2009.01)
*G06F 15/78* (2006.01)

(52) U.S. Cl.
CPC .......... *H04L 9/3263* (2013.01); *H04L 9/3268* (2013.01); *H04L 63/0428* (2013.01); *H04L 63/0435* (2013.01); *H04L 63/0442* (2013.01); *H04L 63/0853* (2013.01); *H04L 63/0869* (2013.01); *H04W 12/06* (2013.01); *H04L 2209/64* (2013.01)

(58) Field of Classification Search
CPC ... H04L 9/3268; H04L 2209/64; H04L 12/06; H04L 63/0442; H04L 63/0435; H04W 12/06; G06F 15/7807
See application file for complete search history.

(56) References Cited

U.S. PATENT DOCUMENTS

| | | | |
|---|---|---|---|
| 2011/0271296 A1* | 11/2011 | Tu | H04N 5/44543 725/25 |
| 2012/0221473 A1* | 8/2012 | Redmann | G06Q 30/06 705/5 |
| 2013/0182845 A1* | 7/2013 | Monica | H04L 63/0869 380/270 |

\* cited by examiner

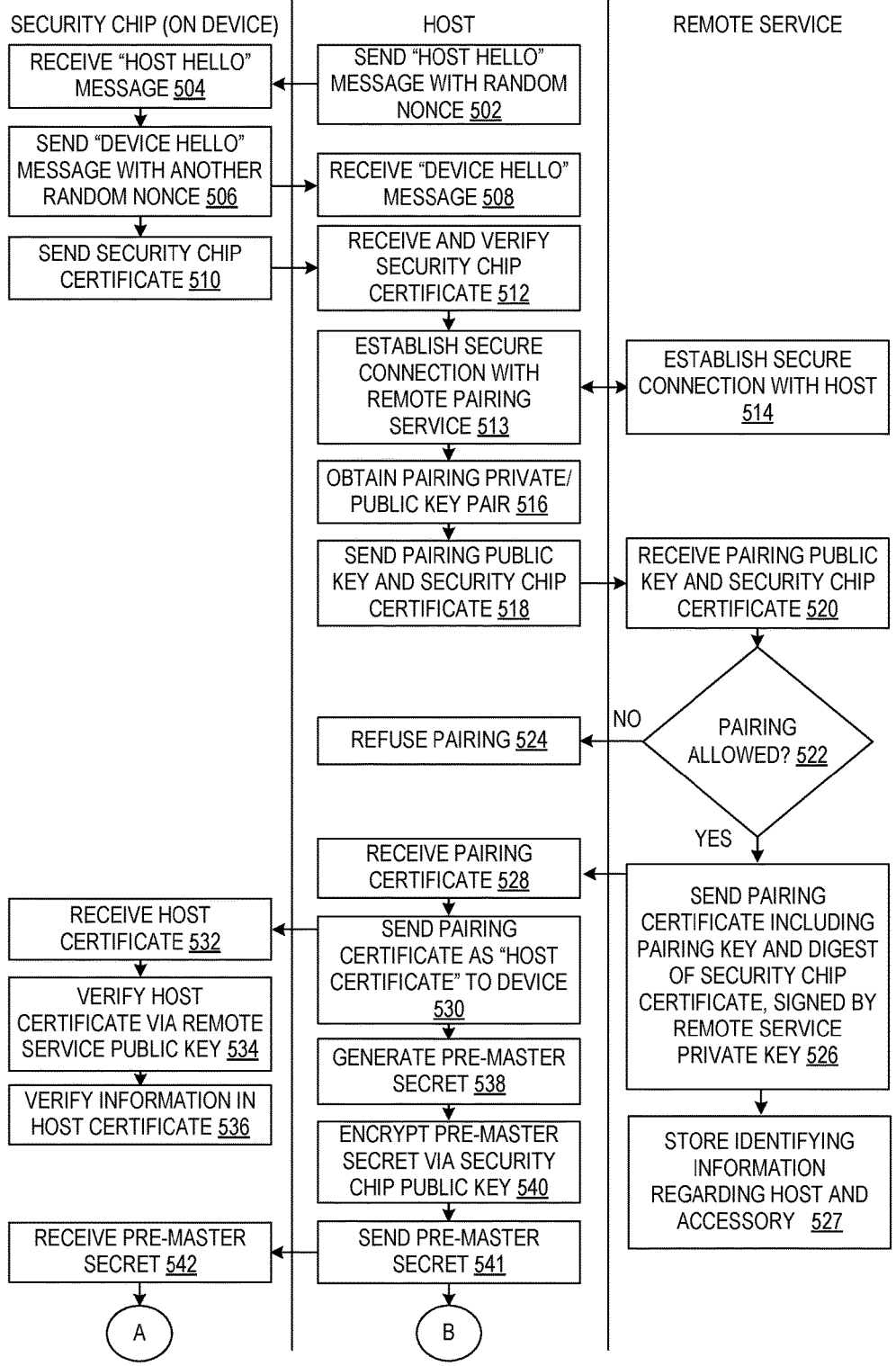

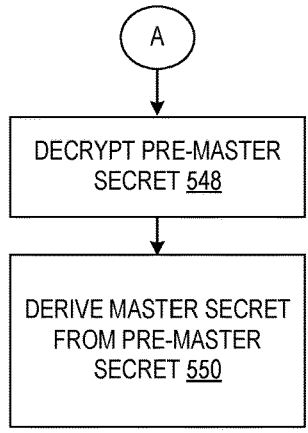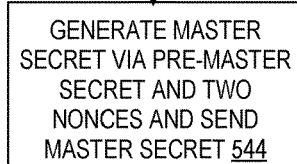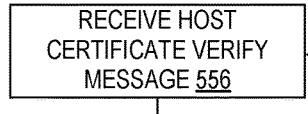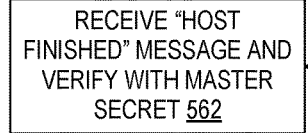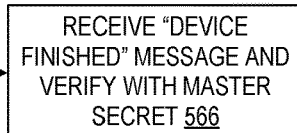

SECURING A COMPUTING DEVICE ACCESSORY

CROSS REFERENCE TO RELATED APPLICATIONS

This application is a continuation of U.S. patent application Ser. No. 15/495,543, filed Apr. 24, 2017, which is a continuation of U.S. patent application Ser. No. 14/827,677, filed Aug. 17, 2015, now U.S. Pat. No. 9,660,815, which is a divisional of U.S. patent application Ser. No. 13/757,561, filed Feb. 1, 2013, now U.S. Pat. No. 9,124,434, and entitled "SECURING A COMPUTING DEVICE ACCESSORY," the entire contents of each of which are hereby incorporated by reference for all purposes.

BACKGROUND

Counterfeit computing device accessories may have negative impacts on a manufacturer and/or seller of legitimate accessories. As such, various strategies may be used to help prevent computer accessory counterfeiting. For example, some counterfeit prevention schemes may utilize a security chip on each authentic device, wherein the security chip may allow a host computer to authenticate the device.

Even authentic accessory devices may be vulnerable to forms of unauthorized use. For example, some accessory devices may be available at different price points with different value-add features enabled, such that more expensive devices include more enabled value-add features. This may allow consumers to choose an appropriate or desired product for their needs and/or desires, but also may provide an opportunity for counterfeiters and/or hackers to unlock features without authorization on a lower-cost model of the device.

SUMMARY

Various embodiments are disclosed that relate to security of a computer accessory device, from manufacturing of components of the accessory device through consumer use of the accessory. For example, one non-limiting embodiment provides a host computing device configured to conduct an initial portion of a mutual authentication session with an accessory device, and send information regarding the host computing device and the accessory device to a remote pairing service via a computer network. The host computing device is further configured to receive a pairing certificate from the remote pairing service, the pairing certificate being encrypted via a private key of the remote pairing service, and complete the mutual authentication with the accessory device using the pairing certificate from the remote pairing service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A and 5B show a flow diagram depicting an embodiment of a method for mutually authenticating an accessory device and a host computing system via a third-party remote pairing service.

DETAILED DESCRIPTION

Figure 1:
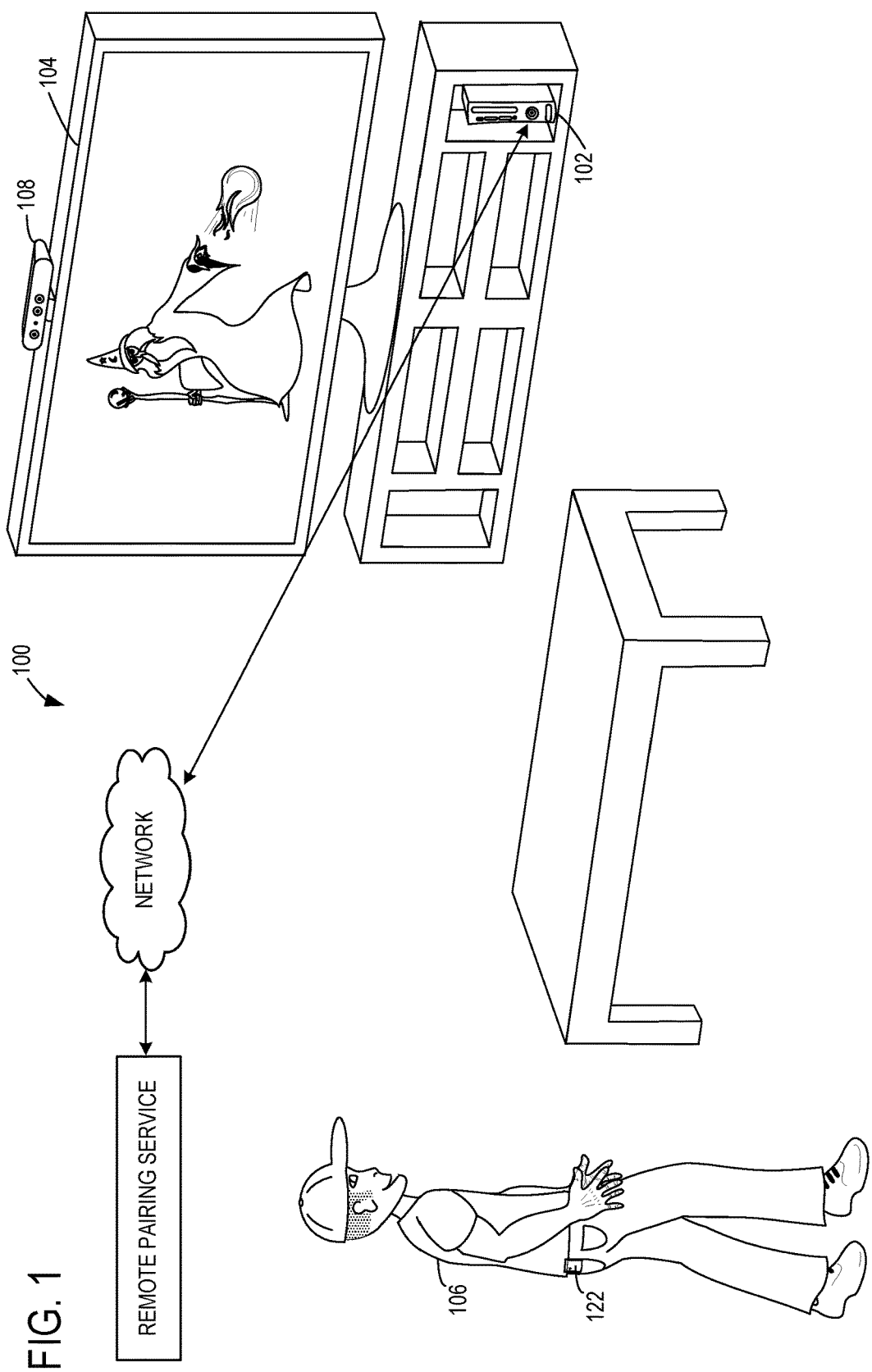
FIG. 1 shows example embodiments of a computing device and an accessory device.

As mentioned above, some computer accessory counterfeit prevention schemes may utilize a security chip on each authentic device, wherein the security chip may allow a host computer to authenticate the device. However, such counterfeit prevention schemes may authenticate the accessory without any knowledge of the host computing device to which the accessory is connected. Further, if the security chip itself is stolen or lost, the security chip may be used to produce counterfeit devices.

Further, as described above, even authentic accessory devices may be vulnerable to forms of unauthorized use. For example, some accessory devices may be available at different price points with different features enabled, such that more expensive devices may comprise more enabled value-add features. This may allow consumers to choose an appropriate or desired product for their needs and/or desires, but also may provide an opportunity for counterfeiters and/or hackers to unlock features without authorization on a lower-cost model of the device to obtain the value-add features without payment.

Previous solutions for securing value-add features may rely upon the use of a secret key to check the validity of a firmware image prior to a firmware update to prevent unauthorized updates. However, employing a single key to sign each firmware image may allow all systems to be compromised if the single key becomes known.

As such, embodiments are disclosed herein that address various issues with preventing counterfeit production and/or use of computing accessories. For example, to prevent the use of lost or stolen security chips, some embodiments are directed to the activation of individual security chips at a factory where the security chips are installed into an accessory device so that lost or stolen security chips cannot be used to produce counterfeit devices.

Additionally, embodiments are directed to the mutual authentication of a computing device accessory and a host computing device. This may facilitate SKU (stock keeping unit) differentiation of a computer accessory. For example, mutual authentication may be used to authenticate a SKU intended for use with a particular host, while one-way authentication may be used to authenticate a different SKU intended for different hosts. This also may allow for "pairing" capability between a specific accessory device and a specific host computing system. As described in more detail below, such pairing may be controlled by a remote third-party service so that an unauthorized accessory and/or a compromised console may be restricted from working with other parts of an ecosystem.

Yet other embodiments are directed to the secure unlocking of an accessory device to prevent unauthorized unlocking of value-add features. As described in more detail below, these embodiments may utilize a secure hardware module on an otherwise unsecure chip (e.g. a system on a chip (SOC)) to provide for secure interactions between the security chip and the SOC, such that the security chip, rather than firmware on the SOC chip, controls the unlocking process. This may enable producers of SOCs that may not have expertise in security to produce secure SOC chips by incorporating the hardware security module into the SOC design.

FIG. 1 shows an example use environment 100 for a computing system and accessory device according to an embodiment of the present disclosure. The use environment 100 comprises a computing device 102 in the form of a video game console in communication with a display device 104 such that the computing device 102 may output video content to the display device 104. A user 106 is illustrated as interacting with the computing device 102 via an accessory device 108 in the form of a sensor system configured to sense the user 106 via one or more use environment sensors. The accessory device 108 may comprise any suitable sensor or sensors, including but not limited to a two dimensional image sensor (e.g. an RGB or grayscale sensor), a depth image sensor (e.g. a time of flight or structured light depth sensor), a stereo camera system, one or more microphones (e.g. a directional microphone array), and/or any other suitable sensors. While described herein in the context of a host video game console and an accessory sensor system, it will be understood that the disclosed embodiments may be applied to any suitable host and accessory systems.

Figure 2:
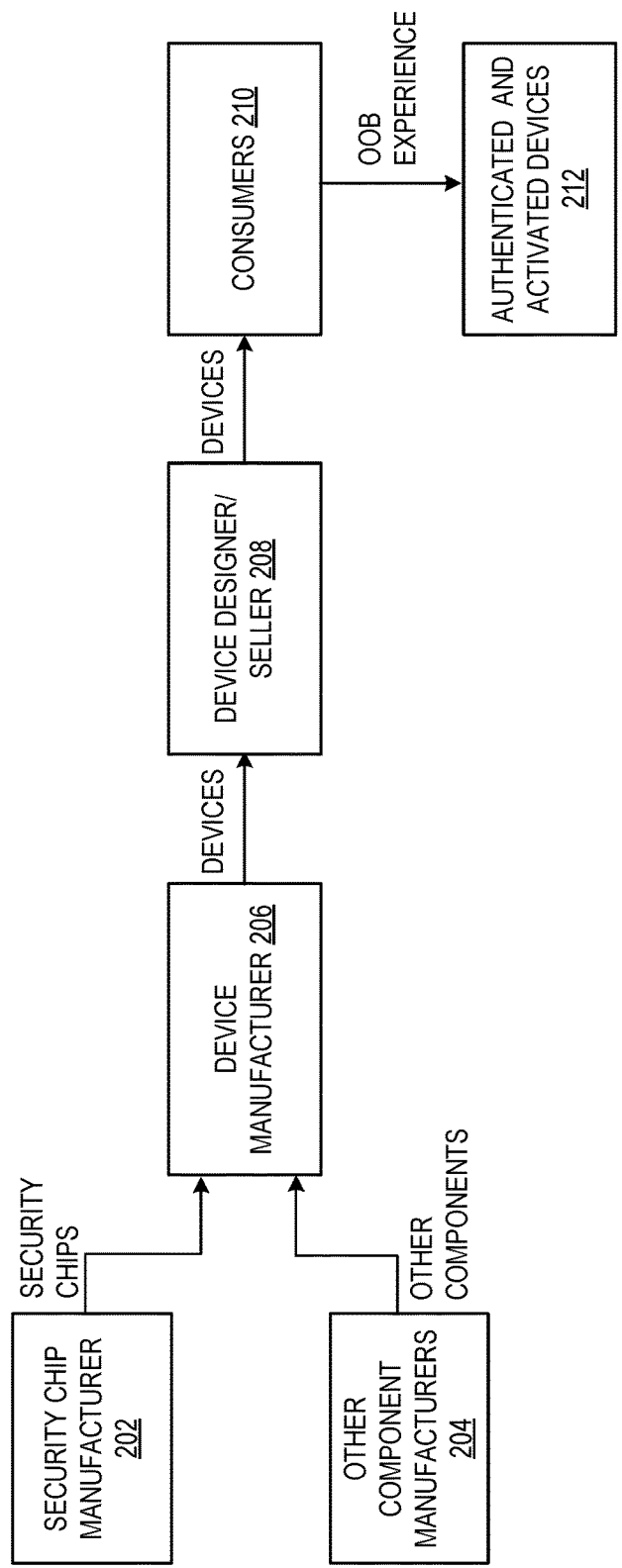
FIG. 2 shows a block diagram schematically illustrating various example steps between accessory device component manufacturing and end usage.

FIG. 2 shows a block diagram that depicts various steps in an example method 200 of manufacturing and using an accessory device. First, method 200 comprises manufacturing security chips and other components of the accessory device at component manufacturers, as indicated respectively at 202 and 204. It will be understood that various components may be made at different locations, and then transported to an assembly facility for accessory device production. As such, method 200 comprises transporting the security chips and the other components used to assemble the accessory to an accessory device manufacturer, as indicated at 206. As will be described above, the security chips may be manufactured such that they are inactive until activated at the accessory device manufacturing facility so that they cannot be used in counterfeit accessories if lost or stolen prior to accessory device manufacturing.

At the accessory device manufacturing facility, the accessories are manufactured from the components received from the component manufacturers. As described below, the security chip for each accessory may be activated during or after manufacturing the accessory that incorporates that chip. Then, at 208 and 210 respectively, the manufactured accessories are transferred to the designer/seller of the accessories, and then sold to consumers. A consumer may then connect an authorized accessory device to a suitable host device. Upon authentication and unlocking, authenticated and activated accessory devices are obtained for use and enjoyment.

Figure 3:
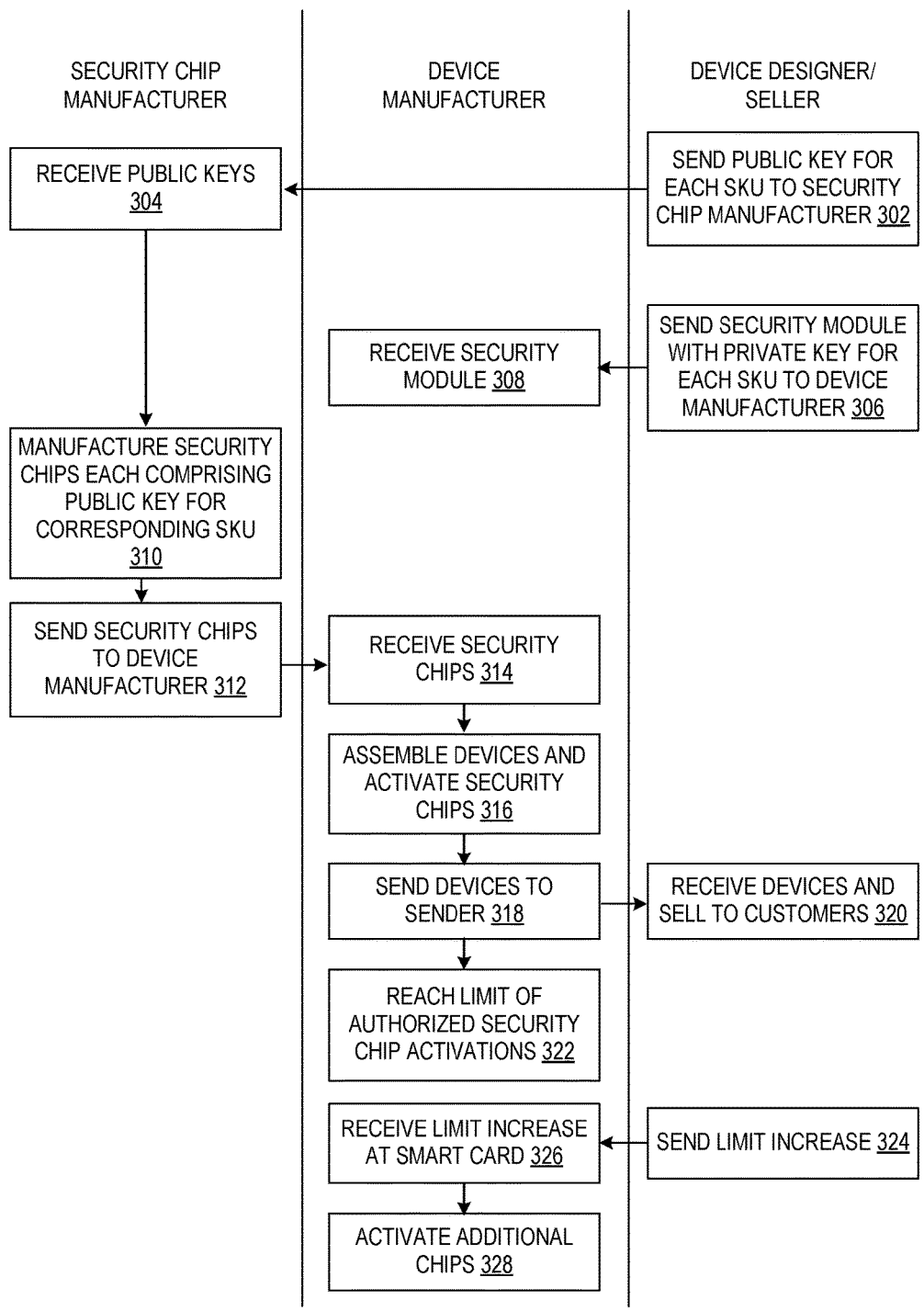
FIG. 3 shows a flow diagram of an embodiment of a method for securing an accessory device during component manufacturing, component delivery, and device manufacturing.

FIG. 3 illustrates an embodiment of a method 300 for preventing unauthorized use of security chips that are lost, stolen or otherwise improperly obtained prior to accessory device manufacturing. Briefly, method 300 utilizes a private/public key pair, wherein the public key is provided to a security chip manufacturer and the private key is provided to an accessory device manufacturer under secure conditions. The private key may be provided to the security chip manufacturer in the form of a smart card or other computing device with suitable security characteristics (e.g. that is difficult to reverse engineer), herein referred to as a "security module." Further, the security module also may comprise code executable to limit a number of security chips that may be activated by the security module. In this manner, any breach of security, e.g. via breach of a private key stored on the security module, may be limited to the number of authorized activations, and thus may limit the effect of the security compromise. Further, in some embodiments, the security module may comprise different private keys (each with a corresponding public key) for different SKUs of an accessory device.

Method 300 shows processes that occur at each of a security chip manufacturer, an accessory device manufacturer, and a device designer/seller that utilizes the accessory device manufacturer to manufacture accessory devices for selling. Method 300 comprises, at 302 sending a public key, or in some embodiments a public key for each SKU, for an accessory device security chip to the security chip manufacturer, and at 304, receiving the public key(s) at the security chip manufacturer. Method 300 further comprises, at 306, sending a security module with a private key for each public key to the accessory device manufacturer, where it is received at 308.

Method 300 further comprises, at 310, manufacturing security chips, wherein each security chip comprises the appropriate public key (e.g. a correct public key for an intended SKU of an accessory device). The security chips are manufactured to be in an inactive state, such that the chip firmware responds only to an "Activate" command initially, and does not perform other security chip operations other than those used in the activation process until activation has been completed. It will be understood that the accessory devices that incorporate the security chips may not operate until the security chip is activated and the accessory device is authenticated.

Upon manufacturing the inactive security chips with the appropriate public key, method 300 comprises, at 312, sending the security chips to the accessory device manufacturer, where they are received at 314. Next, at 316, method 300 comprises assembling the accessory devices and then activating the security chips. Details on an example security chip activation process are described below with reference to FIG. 4. Upon completing manufacturing of the accessory devices and activating the security chips, method 300 comprises, at 318, sending the accessory devices to the designer/seller, who sells the devices to consumers at 320.

As mentioned above, in some embodiments the security module or other private key storage device may comprise executable code that limits a number of security chip unlocks that may be performed by that security module. As such, after activating the authorized number of security chips, method 300 comprises, at 322, reaching the limit of authorized security chip activations for that security module. In this instance, no additional security chips may be activated unless a new security module is obtained from the accessory device designer/seller (or other party in charge of the security chip public/private keys), or the limit for the current security module and current public/private key(s) is increased. Imposing a limit on a number of security chips that may be activated per security module may help to limit the negative effects of a breach of the private keys on the security module.

In some embodiments, a secure communications channel may be used to transmit an update of the security chip activation limit to the security module. As such, method 300 comprises transmitting an instruction to increase the chip activation limit for that security module (assuming that no breach of the security module has occurred). Method 300 then comprises, at 326, receiving the limit increase at security module, and, at 328, activating additional security chips. It will be understood that, if it is determined that the private keys on the security module have been breached, then a new public/private key pair may be generated in place of each breached private key, and the new private keys may be transferred to the accessory device manufacturer via a new security module.

Figure 4:
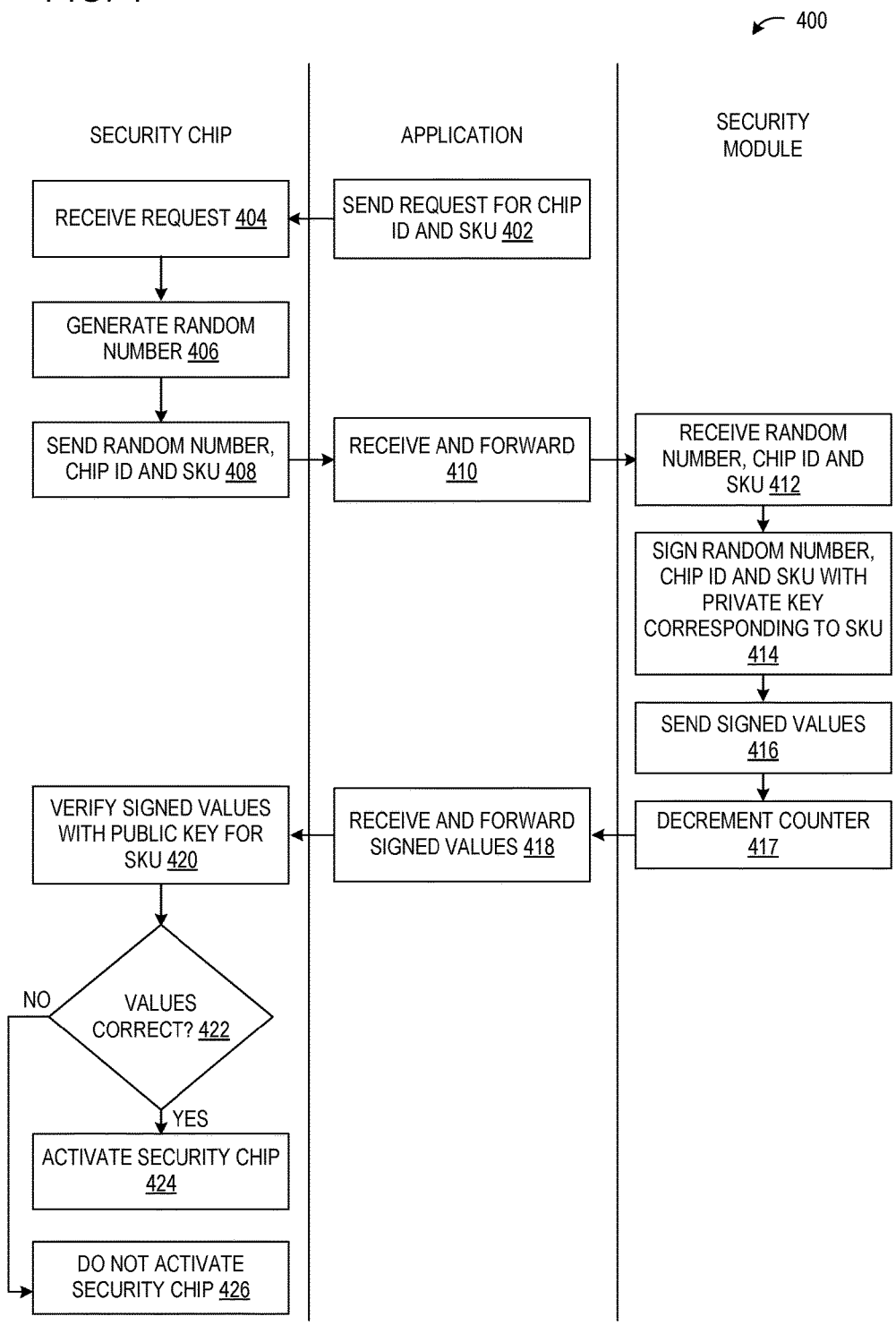
FIG. 4 shows a flow diagram depicting an embodiment of a method for activating a security chip on an accessory device during accessory device assembly.

The security chips may be activated at the accessory manufacturing location in any suitable manner. FIG. 4 shows a flow diagram depicting an example embodiment of a method for activating a security chip at an accessory device manufacturer location. FIG. 4 shows processes that occur at each of a security chip on an accessory device, a security module, and an application configured to enable communication with the security module (e.g. a smart card interface application running on a computer).

Method 400 comprises, at 402, sending a request from the application to the security chip for the chip identification number and, in some embodiment, for an SKU of the security chip. The security chip receives the request at 404. In response, the security chip generates a random number at 406, and sends the random number, the chip identification number, and the SKU to the application at 408. The application receives this information and forwards it to the security module at 410, where it is received at 412. Upon receipt, the security module signs the random number, chip ID, and SKU with the appropriate private key (e.g. a private key corresponding to the SKU) at 414, and sends the signed values to the application at 416. The security module may further decrement (or increment, depending upon particular implementation) an activation limit counter, as indicated at 417. In other embodiments, the activation limit counter may be decremented after chip activation is complete.

Continuing, method 400 comprises, at 418, receiving the signed values, and forwarding the signed values to the security chip. Next, at 420, the security chip verifies the signed values using the public key that was included on the security chip in manufacturing, and then determines at 422 if the verified values match the correct values that were previously sent to the security module. If the values are correct, then method 400 comprises, at 424, activating the security chip. On the other hand, if the values do not match, then method 400 comprises, at 426, not activating the security chip.

Once the security chip is activated, the accessory device is ready to be sold to consumers. As mentioned above, the accessory device may include security measures that prevent the accessory device from being used until additional security conditions are met. For example, an accessory device may be configured not to function when first connected to a host device until it has been authenticated. In some embodiments, such an authentication process may be driven from the host, such that the accessory device simply responses to host commands or messages. For example, depending on the command, the accessory device either sends data to the host for verification, or processes data sent from host to verify that it follows the relevant authentication protocol correctly. Only when authentication has been completed successfully will the device start normal functionality.

In some instances, the authentication may be a one-way authentication in which the accessory device does not authenticate the host. In other embodiments, the authentication may be mutual such that the host and the accessory device authenticate each other. This may allow a "pairing" of the host and the accessory device to be established, so that the accessory device is specifically associated with that host.

Figure 6:
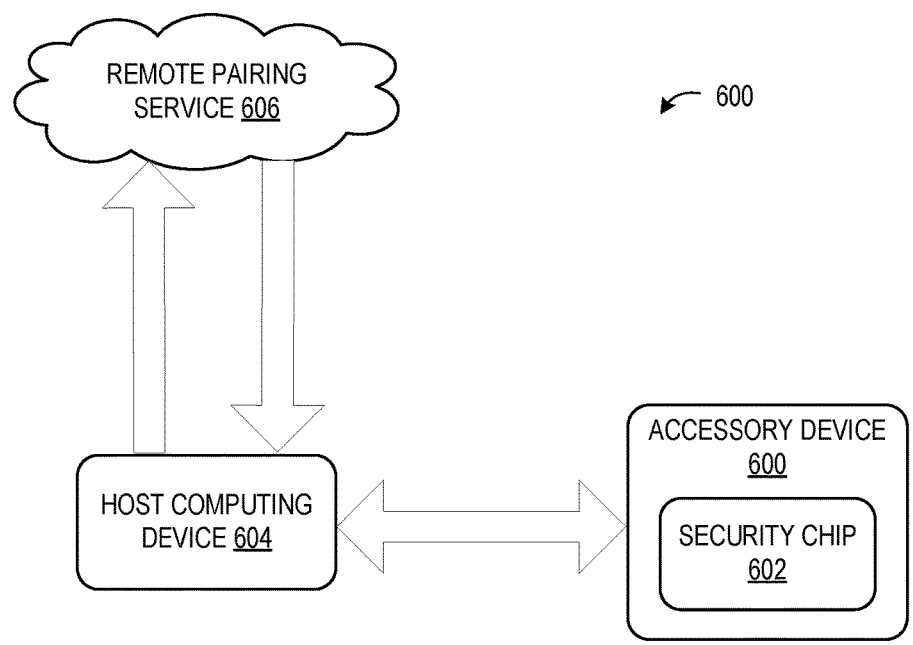
FIG. 6 shows a block diagram schematically illustrating embodiments of the accessory device, host computing device, and remote pairing service of the embodiment of FIGS. 5A and 5B during mutual authentication.

FIGS. 5A and 5B show a flow diagram depicting an embodiment of a method 500 for mutually authenticating a host computing device and an accessory device. Examples of suitable hosts and accessory devices include, but are not limited to, the video game console and sensor system illustrated in claim 1. Referring briefly to FIG. 6, method 500 illustrates processes performed at each of an accessory device 600 comprising a security chip 602, a host computing device 604, and a remote pairing service 606 that mediates the mutual authentication. While various parts of the mutual authentication protocol may be described as being performed by the accessory device, it will be understood that the entity that processes the messages may actually be the security chip inside the device, and the accessory device firmware simply transports messages between the host and security chip. This may help to prevent middle man attacks.

Method 502 comprises, at 502, sending a "host hello" message from the host computing device to the accessory device, wherein the host hello message comprises a random nonce. At 504, the accessory device receives the host hello message, and at 506 sends a "device hello" message with another random nonce, which is received by the host at 508. Further, at 510, the accessory device also sends a security chip certificate to the host device, which is received and verified by the host at 512 (e.g. by contacting a certificate authority that issued the device certificate) to confirm that the security chip certificate is valid. Further, in some embodiments, the host may receive configuration information from the accessory device during the initial portion of the mutual authentication session during this initial portion of authentication, and deny authentication if it is determined via examining the configuration information that the accessory device is not permitted to be used with the host device (e.g. the accessory device is the incorrect SKU).

Next, the host and remote pairing service establishes a secure connection, as shown at 513 and 514, to initiate the pairing process. The host then obtains a pairing private/public key pair to assist with the pairing function, as shown at 516. The pairing private/public key pair may be generated as a part of the pairing process, or may be pre-configured. After obtaining the pairing private/public key pair, the host sends, at 518, the security chip certificate and the pairing private key to the remote pairing service, which is received at 520.

Upon receipt of this information, the remote pairing service may determine, at 522, whether pairing should be allowed for the host and the accessory device. For example, if it is known that either device has been compromised, if the accessory is an incorrect SKU for the host, and/or if other potential issues are known, then pairing may be refused, as indicated at 524. On the other hand, if it is determined at 522 that pairing between the host and accessory device is permitted, then the remote pairing service may send, at 526 a pairing certificate to the host, wherein the pairing certificate includes the pairing public key and a digest of the security chip certificate, all signed via a private key of the pairing service (which is to be distinguished from the pairing key obtained by the host at 516). The remote pairing service also may store identifying information regarding the host device and the accessory device for use in determining whether future pairing involving one or more of the host device and the accessory device is allowed, as shown at 527.

The host receives the pairing certificate at 528, and then forwards the pairing certificate as a "host certificate" to the accessory device at 530. The accessory device receives the host certificate at 532, and verifies the host certificate via a public key of the remote pairing service at 534. This public key corresponds to the private key used to encrypt the pairing certificate at 526. After verifying the host certificate via the public key, the accessory device may verify the information contained in the host certificate, as indicated at 536. If the information in the pairing certificate is not verified, then the pairing process may cease.

The host also generates a "pre-master secret" at 538, and encrypts the pre-master secret via a public key of the security chip on the accessory device, so that only the private key holder (e.g. the security chip on the accessory device) can decrypt it. The pre-master secret may comprise any suitable information, such as a random number. The host sends the pre-master secret to the accessory device at 541, which receives the pre-master secret at 542. The host further generates, at 544, a "master secret" via the pre-master secret and the two nonces exchanged during the host/accessory "hello" message exchange.

Upon receipt of the pre-master secret, the accessory device may decrypt the pre-master secure via the accessory device private key, as indicated at 548, and may derive the master secret from this value and the two "hello" nonces, as shown at 550. Next, the host, at 552, generates a "host certificate verify" message and signs the message with the private pairing key obtained at 516. The host then sends the host certificate verify message to the accessory device at 554. The accessory device receives the host certificate verify message at 556, and verifies it at 558 via the pairing pubic key that was included in the host certificate. This allows the accessory device to confirm that the pairing public key in the host certificate was sent by the same device that provided the pairing public key to the remote service.

Continuing, at 560, the host generates and sends a "host finished" message to the accessory device, which receives the message at 562. Likewise, the accessory device generates and sends a "device finished message" at 564, which is received by the host at 566. Upon completion of the mutual authentication process, the accessory device may unlock and begin ordinary functioning. The mutual authentication process of method 500 may offer advantages over other mutual authentication processes, such as TLS (Transport Layer Security) mutual authorization. For example, with method 500, each host and device pair has its own key, so compromising one will not lead to a massive breakdown of the ecosystem. Further, as pairing is controlled by an online service, an offline attack may not be successful against the process. Additionally, as the security chip itself controls the process on the accessory device side, the security chip may be used in a variety of different devices, thereby allowing the authentication process to be adapted to other accessories.

As mentioned above, in some instances, a one-way authentication may be utilized to authorize the unlocking of an accessory device. Such an authentication may be similar to that described with reference to FIGS. 5A-5B, but with the omission of the steps involving the remote service and pairing certificate, such that the pre-master secret message is the first message sent from the host to the accessory after receiving and verifying the security chip certificate at the host. Further, in some embodiments, different accessory SKUs may utilize different authentication processes. For example, an SKU intended for use with a particular host may utilize mutual authentication, while an SKU intended for use with a broader range of computing devices (e.g. PC-type devices) may utilize one-way authentication. In such an embodiment, if a host refuses mutual authentication due to a device being an incorrect SKU, the host may perform one-way authentication to enable use of the accessory device. It will be understood that any suitable one-way authentication process may be used.

Figure 7:
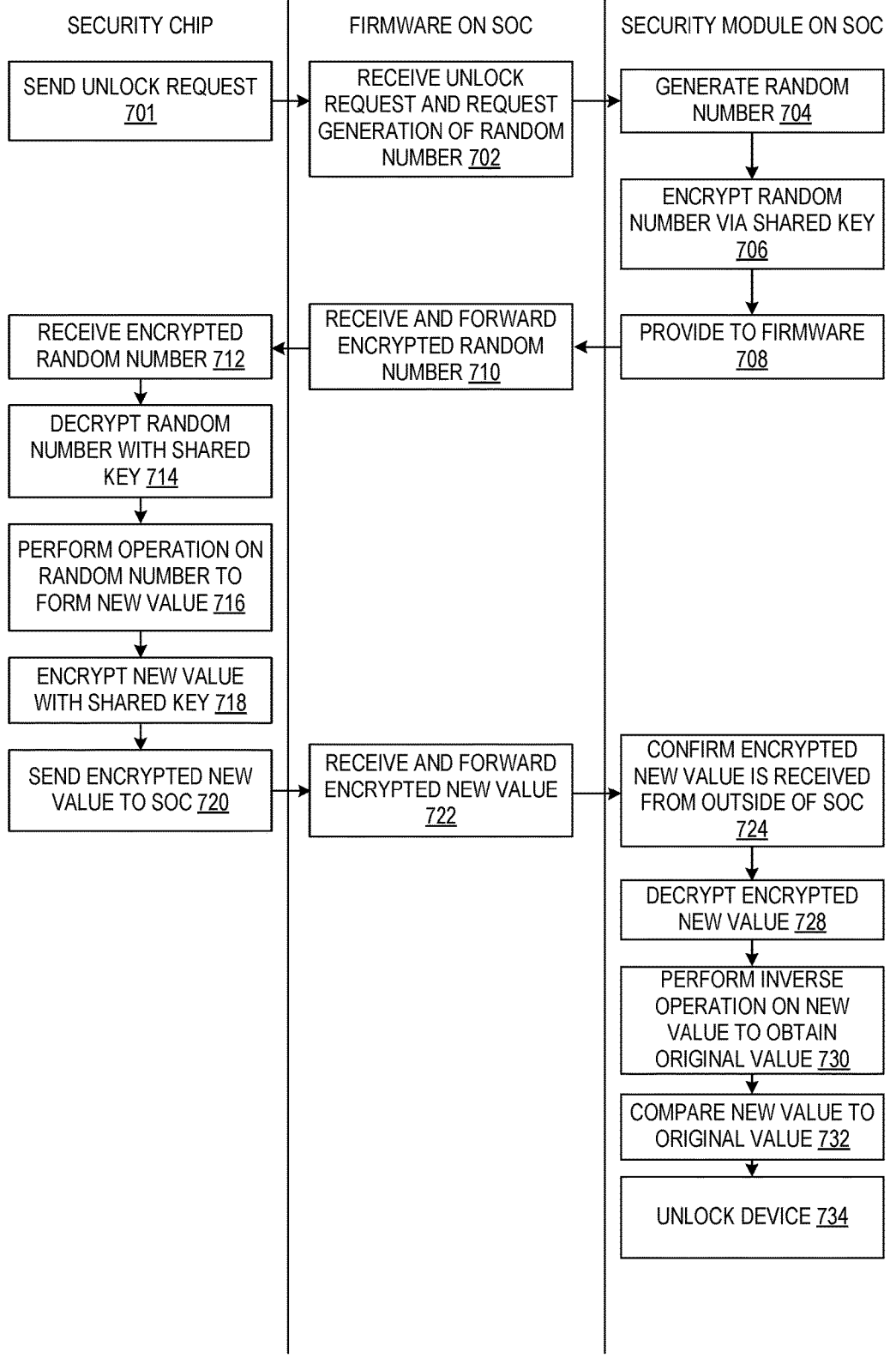
FIG. 7 shows a flow diagram depicting an embodiment of a method for unlocking an accessory device after authenticating the accessory device.
Figure 8:
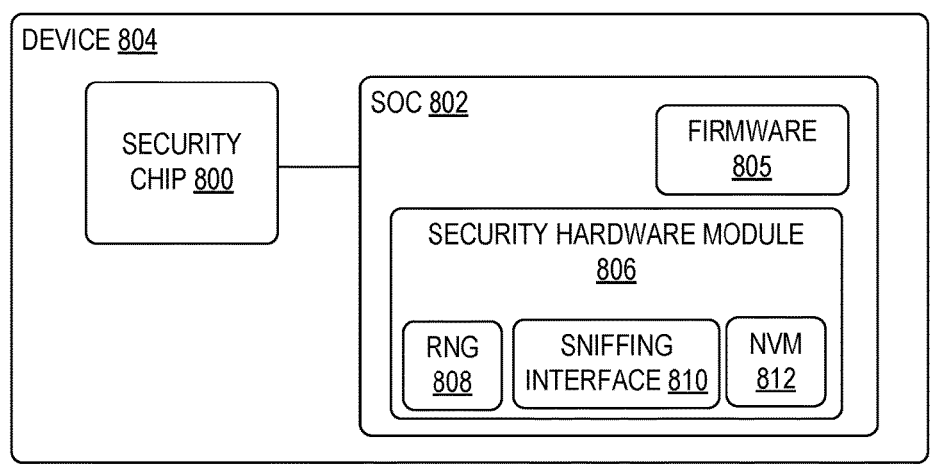
FIG. 8 shows a block diagram schematically illustrating an embodiment of the accessory device of FIG. 7.

FIG. 7 shows a flow diagram depicting an example embodiment of a method 700 for unlocking an accessory device after authentication. Referring briefly to FIG. 8, method 700 illustrates processes performed on a security chip 800 and a system-on-a-chip (SOC) 802 within the accessory device 804. The SOC comprises firmware 805 that is unsecure, and a security hardware module 806 implemented as hardware on the SOC to extend the secure domain of the security chip 800 into the SOC 802. The security hardware module 806 may be incorporated into any desired non-secure component to add the capability to securely transfer security state information from the security chip directly to the security hardware module. The security hardware module can then use the security state to enable or disable specific features within the SOC.

By defining the security hardware module, the scope of the work to validate the security of the SOC is reduced. The majority of the SOC can be considered untrusted, while the SecurityHardwareModule is trusted. The use of the security hardware module hardware block may further enable incorporation of this hardware block into a device defined by vendors who may not have technical capability and/or experience in developing secure products.

The security hardware module 806 may comprise any suitable components. For example, in the depicted embodiment, the security hardware module 806 comprises a random number generator 808 or other suitable entropy source, a hardware sniffing interface 810, and non-volatile memory 812. The random number generator 808 may be used in formulating challenge messages to send to the security chip 800. The hardware sniffing interface 810 may be used to determine whether messages received at the security hardware module 806 are received from the security chip 800 outside of the SOC, and not from potentially compromised firmware on the SOC. The non-volatile memory 812 may be used to store a key used for encrypting communications with the security chip. In some embodiments, the key may be a symmetric key, such that the same key is stored on the security chip, and may be particular to that security chip/SOC pair, such that each accessory device has its own symmetric key pair. In other embodiments, any other suitable key may be used.

Returning to FIG. 7, method 700 comprises, at 701, receiving an unlock request (e.g. from the host after authentication has been completed), and 702, sending a request from firmware on the SOC to the security hardware module on the SOC for the generation of a random number. In response, the security hardware module generates a random number, at 704, and encrypts the random number via the shared key, at 706. The encrypted random number is then provided to firmware at 708, such that the firmware only sees the encrypted version of the number. The firmware receives the encrypted random number, and then forwards the encrypted random number to the security chip, as indicated at 710. The security chip receives the encrypted random number, at 712, decrypts the random number with the shared key, at 714, and then performs an operation on the decrypted random number to form a new value, at 716. Any suitable operation may be performed. One non-limiting example is a twos complement operation.

After performing the operation on the random number to produce a new value, the security chip encrypts the new value via the shared key, at 718, and sends the encrypted new value to the SOC, at 720. The SOC receives the encrypted new value, at 722, and forwards it to the security hardware module. The security hardware module confirms, at 724, via the hardware sniffing interface that the encrypted new value was received from outside of the SOC, rather than originating from a location on the SOC. Next, the security hardware module decrypts the encrypted new value via the shared key at 728, and performs an inverse operation to that performed at 716 to obtain the original value of the random number. The security hardware module may then compare the result of the inverse operation to the original random number to ensure that the security chip is authentic. If the comparison is correct, then the security hardware module may unlock the SOC, thereby enabling the accessory device to function.

In some embodiments, the unlock instruction sent by the security chip may comprise a single bit that indicates that the device is to be unlocked. In other embodiments, multiple bits may be sent by the security chip to unlock different features of the SOC (e.g. where each bit controls a different feature). This may provide an additional mechanism for SKU differentiation.

It will be understood that the above-described embodiments are presented for the purpose of example, and that any other suitable methods for security chip activation, mutual or one-way authentication, and device unlocking may be used. For example, another example embodiment of a method for activating security chips is as follows. First, at chip manufacturing time, a random master key is generated per SKU of security chips. Then, using this random master key and also using a per-chip ID, a per-chip activation key may be derived using HMAC algorithm such as HMAC-SHA256.

PerChipActivationKey=HMAC-SHA256(MasterKey, PUID)

The per chip activation key is stored securely inside the security chip, and cannot be read outside the security chip. As this is performed for each security chip, every chip has a different activation key stored. Thus, where particular chip's activation key is compromised, other chips are not affected. This may help to provide extra security against attacks for the activation key.

Next, at accessory device manufacture time, the master key is securely transferred via a security module (e.g. a smart card) from the security chip factory to the accessory device factory. The smart may accept the security chip identification number as an input, derive the per chip activation key using the same algorithm used at security chip manufacture time, and generate another digest using the activation key:

ActivationDigest=HMAC-SHA256(PerChipActivationKey, PUID+AdditionalTrackingInfo).

The activation digest is the input of the "Activate" command to the security chip. When the security chip receives this input, it may be configured to calculate the same digest using its own copy of the activation key. If the digest matches the input, the security chip may activate itself and starting regular functions.

In the calculation of the ActivationDigest, the value "AddtionalTrackingInfo" may be used to track each chip's activation. Any suitable value may be used. For example, in some embodiments, the AdditionalTrackingInfo may be a sequence number recording how many security chip the security module has activated (SequenceNumber). This information may be passed to the security chip as the input of the Activate command as well:

Activate(SMID, SequenceNumber, ActivationDigest).

Further, this information also may be stored securely inside the chip after activation so that, later, the security chip may optionally report this information to an online system, and the online system can track each chip and its activation status as well. This may add yet another layer of security, as in the event the security module is also stolen (but the master key is not disclosed yet), the online system may know how many chips of the stolen security module has been activated. Further, as described above, each security module also may be limited as to how many chips it can activate, thereby helping to lessen the damage caused by a stolen security module. The security module may be password protected to provide for additional security. As the activation key is per-chip for this activation process, a stolen chip will not compromise other chips.

In some embodiments, the methods and processes described above may be tied to a computing system of one or more computing devices. In particular, such methods and processes may be implemented as a computer-application program or service, an application-programming interface (API), a library, and/or other computer-program product.

Figure 9:
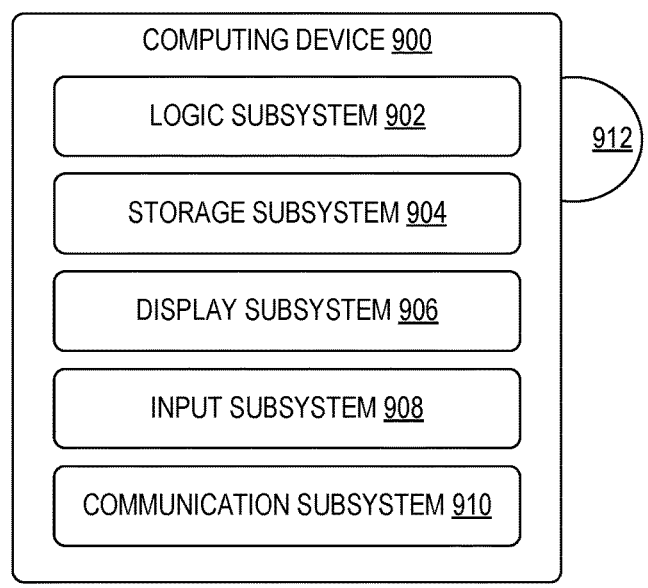
FIG. 9 shows a block diagram illustrating an example embodiment of a computing system.

FIG. 9 schematically shows a non-limiting embodiment of a computing system 900 that can enact one or more of the methods and processes described above. Computing system 900 is shown in simplified form. It will be understood that virtually any computer architecture may be used without departing from the scope of this disclosure. In different embodiments, computing system 900 may take the form of a mainframe computer, server computer, desktop computer, laptop computer, tablet computer, home-entertainment computer, accessory device, network computing device, gaming device, mobile computing device, mobile communication device (e.g., smart phone), smart card, etc. Examples of computing system include, but are not limited to, the various accessory devices, host devices, and smart cards, and other computing devices described above.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 904 includes one or more physical, non-transitory, devices configured to hold data and/or instructions executable by the logic subsystem to implement the methods and processes described herein. When such methods and processes are implemented, the state of storage subsystem 904 may be transformed—e.g., to hold different data.

Storage subsystem 904 may include removable media and/or built-in devices. Storage subsystem 904 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, in some embodiments, aspects of the instructions described herein may be propagated by a pure signal (e.g., an electromagnetic signal, an optical signal, etc.) via a communications media, as opposed to a storage device. Furthermore, data and/or other forms of information pertaining to the present disclosure may be propagated by a pure signal.

In some embodiments, aspects of logic subsystem 902 and of storage subsystem 904 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage subsystem, and thus transform the state of the storage subsystem, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, game controller. In some embodiments, the input subsystem may comprise or interface with selected natural user input (NUI) componentry, such as the accessory device embodiments described above. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At an accessory device, a method of authenticating pairing between a host device and the accessory device, the method comprising:
   establishing a connection with the host device;
   sending information including a security component certificate to the host device;
   receiving a pairing certificate from the host device, the pairing certificate encrypted via a private key of a remote pairing service;
   decrypting the pairing certificate using a public key of the remote pairing service, the public key corresponding to the private key of the remote pairing service used to encrypt the pairing certificate;

verifying the information in the pairing certificate to verify the host device; and in response to the host device being verified, then completing pairing between the host device and the accessory device.

2. The method of claim 1, further comprising, after completing pairing, sending an unlock instruction from a security component on the accessory device to a security hardware module on a system on a chip (SOC) on the accessory device.

3. The method of claim 2, further comprising conducting an authentication process between the security component and the SOC after sending the unlock instruction, and then unlocking the accessory device after conducting the authentication process.

4. The method of claim 3, wherein the authentication process between the security component and the SOC comprises an authentication process between a security hardware module on the SOC and the security component.

5. The method of claim 3, wherein the authentication process between the security component and the SOC further comprises generating a random number at the SOC, encrypting the random number, receiving the random number at the security component, decrypting the random number, performing an operation on the random number to form a new value, and encrypting the new value.

6. The method of claim 5, wherein the authentication process between the security component and the SOC further comprises receiving the new value at the SOC, performing an inverse operation on the new value to obtain an original value, comparing the new value to the original value, and if the new value matches the original value, unlocking the SOC.

7. The method of claim 6, wherein the authentication process between the security component and the SOC further comprises confirming that the new value is received from outside of the SOC before performing the inverse operation on the new value.

8. The method of claim 1, wherein completing pairing between the host device and the accessory device comprises receiving an encrypted pre-master secret from the host device, and decrypting the pre-master secret to derive a master secret from the pre-master secret.

9. The method of claim 1, wherein the pairing certificate includes information regarding the security component certificate.

10. An accessory device, comprising:
one or more sensors;
a security component;
a system on a chip (SOC);
a logic subsystem;
a storage subsystem comprising instructions executable by the logic subsystem to:
establish a connection with a host device;
send information including a security component certificate to the host device;
receive a pairing certificate from the host device, the pairing certificate encrypted via a private key of a remote pairing service;
decrypt the pairing certificate using a public key of the remote pairing service, the public key corresponding to the private key of the remote pairing service used to encrypt the pairing certificate;
verify the information in the pairing certificate to verify the host device; and
in response to the host device being verified, then complete pairing between the host device and the accessory device.

11. The accessory device of claim 10, wherein the instructions are further executable to, after completing pairing, send an unlock instruction from a security component on the accessory device to a security hardware module on the SOC.

12. The accessory device of claim 11, wherein the instructions are further executable to conduct an authentication process between the security component and the SOC after sending the unlock instruction, and then unlock the accessory device after conducting the authentication process.

13. The accessory device of claim 12, wherein the authentication process between the security component and the SOC occurs between a security hardware module on the SOC and the security component.

14. The accessory device of claim 12, wherein the instructions are executable to conduct the authentication process between the security component and the SOC by generating a random number at the SOC, encrypting the random number, receiving the random number at the security component, decrypting the random number, performing an operation on the random number to form a new value, encrypting the new value, receiving the new value at the SOC, performing an inverse operation on the new value to obtain an original value, comparing the new value to the original value, and if the new value matches the original value, unlocking the SOC.

15. The accessory device of claim 10, wherein the instructions are executable to complete pairing between the host device and the accessory device by receiving an encrypted pre-master secret from the host device, and decrypting the pre-master secret to derive a master secret from the pre-master secret.

16. The accessory device of claim 10, wherein the pairing certificate includes information regarding the security component certificate.

17. An accessory device, comprising:
a security component; and
a system on a chip (SOC) in communication with the security component, the SOC comprising a security hardware module, wherein the accessory device includes instructions executable to perform an unlocking process during pairing with a host device by
sending information including a security component certificate to the host device;
receiving a pairing certificate from the host device, the pairing certificate encrypted via a private key of a remote pairing service;
decrypting the pairing certificate using a public key of the remote pairing service, the public key corresponding to the private key of the remote pairing service used to encrypt the pairing certificate;
verifying the information in the pairing certificate to verify the host device; and
in response to the host device being verified, then unlocking the accessory device by
sending an unlock request from the security component to the SOC,
receiving the unlock request at the SOC, and requesting the security hardware module of the SOC to generate a challenge message,
generating and encrypting the challenge message at the security hardware module of the SOC for sending to the security component,
receiving the challenge message at the security component, decrypting the challenge message, performing an operation on the challenge message to form a new message, and encrypting the new message for sending to the security hardware module of the SOC, receiving the new message at the security hardware module, decrypting the new message, performing an inverse operation on the new message to obtain an original message, compare the new message to the original message, and unlock the accessory device if comparison of the new message to the original message is correct.

18. The accessory device of claim 17, wherein the SOC further comprises firmware configured to communicate between the security component and the security hardware module of the SOC.

19. The accessory device of claim 17, wherein the security hardware module on the SOC is configured to confirm the new message is received from outside of the SOC before decrypting the new message.

20. The accessory device of claim 17, wherein the challenge message comprises a random number.

* * * * *